United States Patent [19]

Busch et al.

[11] Patent Number: 4,579,837

[45] Date of Patent: Apr. 1, 1986

[54] SOLID PHASE PHOTOSENSITIZER FOR GENERATION OF SINGLET OXYGEN

[75] Inventors: George E. Busch, Milan; Allen J. Twarowski, Dexter, both of Mich.

[73] Assignee: KMS Fusion, Inc., Ann Arbor, Mich.

[21] Appl. No.: 663,755

[22] Filed: Oct. 22, 1984

[51] Int. Cl.$^4$ .................. B01J 33/00; B01J 19/12
[52] U.S. Cl. .................. 502/167; 502/150; 502/159; 502/163; 502/173; 502/172; 502/158
[58] Field of Search .............. 204/157.1 R; 502/159, 502/163, 167, 170, 172, 158, 150

[56] References Cited

U.S. PATENT DOCUMENTS

| | | | |
|---|---|---|---|
| 4,072,630 | 2/1978 | Douglas | 502/163 |
| 4,250,053 | 2/1981 | Smith | 502/167 |
| 4,315,998 | 2/1982 | Neckers et al. | 204/158 R |
| 4,394,293 | 7/1983 | Gratzel et al. | 502/159 |

OTHER PUBLICATIONS

Wilson, J.A.C.S., 88:13 (Jul. 5, 1966) pp. 2898–2902.

Primary Examiner—Howard S. Williams
Attorney, Agent, or Firm—Barnes, Kisselle, Raisch, Choate, Whittemore & Hulbert

[57] ABSTRACT

A solid phase photosensitizer and method of use for photochemical generation of singlet oxygen. The sensitizer comprises one or more layers of an organic polycrystalline dye solid which absorbs radiant energy to release triplet excitons. Where multiple layers are employed, triplet state energies of the layers decrease toward the outer surface. A sub-monomolecular surface layer of organic molecules has a triplet state energy which is less than that of the adjacent dye-solid layer but greater than that of molecular oxygen. The sub-monomolecular layer thus functions to trap exciton energy at the sensitizer surface for reaction with gaseous molecular ground state oxygen directed thereover.

6 Claims, No Drawings

SOLID PHASE PHOTOSENSITIZER FOR GENERATION OF SINGLET OXYGEN

The present invention relates to gaseous electronically excited molecular oxygen, termed singlet oxygen in the art, and more particularly to generation thereof.

BACKGROUND OF THE INVENTION

Singlet oxygen has heretofore been studied intensively. See, for example, "Singlet Molecular Oxygen" edited by A. P. Schaap, (Dowden, Hutchinson and Ross), 1976; and "International Conference on Singlet Molecular Oxygen and Its Role in Environmental Sciences," Annals of the New York Academy of Sciences, Vol. 171, Act. I, pages 1–302 (1970).

In addition to use in scientific or research-related fields, singlet oxygen has been proposed for a number of applications. For example, singlet oxygen chemically pumps iodine gas lasers. Applications of the latter and other types, however, require substantial volumes and concentrations of singlet oxygen.

Convenient and efficient production of singlet oxygen remains a goal of the art. Although certain solvent-based reactions generate significant amounts of singlet oxygen, such processes possess a number of inherent limitations. The liquid solvent, as well as cryogenic traps and the like for removal of coincidentally produced impurities, tend to quench the singlet oxygen as the latter is produced and consequently limit efficiency of these generators. Moreover, since the by-products of these solvent-based reactions are not regenerated into the initial reactants, the utility of these systems is further compromised. Furthermore, use of the aforementioned solvent based reactions can be hazardous and require massive apparatus.

It has been recognized that irradiation of gaseous ground state oxygen with laser, microwave or other electromagnetic radiation converts ground state oxygen to singlet oxygen. Singlet oxygen has also been generated by irradiating solid-phase dye sensitizer crystals of rose bengal, eosin or methylene blue, for example. Nechers et al, U.S. Pat. No. 4,315,998, proposes chemically binding the photosensitizing catalysts onto a polymer base. But these techniques do not generate singlet oxygen in desired quantities and at sufficient rates.

Schaap et al, U.S. Pat. No. 4,436,715, describes a method for chemical storage of singlet oxygen in an endoperoxide molecular dispersion bound to a solid phase substrate, and for releasing the singlet oxygen so stored by subjecting the endoperoxide to irradiation. The substrate having a dispersion of hydrocarbon acceptor molecules chemically bound thereto may be retrieved and oxidized to form a closed cycle for storage of singlet oxygen in solid phase and retrieval of singlet oxygen in gas phase.

OBJECTS AND SUMMARY OF THE INVENTION

It is therefore a general object of the present invention to provide an efficient and convenient method for production of singlet molecular oxygen in gas phase which overcomes the aforementioned difficulties and deficiencies in the art. A related and more specific object of the invention is to provide a solid phase sensitizer responsive to absorption of radiant energy to generate and trap triplet excitons on the sensitizer surface for transfer to gaseous molecular oxygen, and to provide a method of singlet oxygen generation which employs such sensitizers.

Briefly stated, these and other objects are accomplished in accordance with the invention by providing a solid phase photosensitizer which comprises a base of organic polycrystaline dye responsive to absorption of radiant energy to generate triplet excitons, and a sub-monomolecular surface layer of organic molecules whose triplet energy state is less than that of the dye base but greater than that of molecular oxygen. (The term "sub-monomolecular layer" as employed here refers to a non-continuous surface layer of molecular thickness.) Triplet excitons generated within the crystal dye base migrate toward the crystal surface and into the submonomolecular surface layer. Since this layer is noncontinuous and has a lower triplet state energy than does the crystal dye base, the triplet excitons cannot collide with each other or migrate back into the crystal base, and thus are effectively trapped at the crystal surface. The method of the invention thus contemplates irradiation of the sensitizer base to generate triplet excitons which are trapped at the sensitizer surface, and passage of gaseous ground state molecular oxygen over such surface, thereby permitting the trapped excitons to transfer energy to oxygen and thereby generate singlet molecular oxygen in gas phase.

A modified sensitizer in accordance with the invention contemplates a crystal base having a plurality of thin polycrystalline dye layers successively deposited on a substrate. Each successive layer from the substrate to the outer surface has a lower triplet energy state than does the next-preceeding layer, and each layer is responsive to a differing wavelength of incident energy. Excitons generated in each layer thus migrate toward the outer surface to be trapped in the sub-monomolecular surface layer. This modified embodiment provides enhanced absorption and utilization of radiant energy.

DETAILED DESCRIPTION

One or more layers of polycrystalline organic dye solid are deposited on a solid substrate having a geometry based upon intended use to form a crystal base. The composition of the substrate may be inert, such as polymer or glass, or may be an organic dye solid having high triplet state energy. The thickness of each layer should be sufficiently large to absorb a substantial portion of incident photon energy at the wavelength associated with that layer, but sufficiently small to permit efficient migration of triplet excitons toward the surface. For many organic dye solids, absorprtion in the region of visible light has a peak absorption coefficient greater than $10^5 \, cm^{-1}$. Crystal layers having a thickness on the order of $10^{-5}$ cm (1000Å) would be satisfactory for such dye solids.

An organic solid having a triplet energy less than that of the outer layer of the crystalline base, but greater than that of ground state oxygen, is then deposited onto the base in such a way as to form a non-continuous surface layer of molecular thickness. Such deposition may be carried out using any suitable conventional technique. The optimum percentage of surface coverage depends upon the materials involved and intended use. In the following examples, the sub-monomolecular layer covers about 1% of the base surface, although this percentage is by no means critical. Ideally, the surface layer would consist of individual molecules bonded to the base but separated from each other so as to avoid triplet annihilation therebetween. As a practical matter, the surface layer is preferably formed as small non-contacting zones which cover as much of the base surface as possible while remaining discrete from each other.

In use for generation of singlet oxygen, one or more of the photosensitizers so described are subject to radiant energy at the excitation wavelength or wavelengths of the dye crystal layers. The resulting excitons generated in the dye base by absorption of photons migrate through the crystal layers toward the surface and are trapped in the sub-monomolecular layer. It will be appreciated, of course, that the layered structure of the dye base, coupled with decreasing triplet state energies toward the trapping surface layer, means that excitons can migrate rapidly and preferentially toward the trapping surface. Gaseous oxygen is directed over the sensitizer surface, and the trapped excitons transfer energy to the ground state oxygen to form singlet oxygen. Without trapping, the triplet exciton energy and localization thereof at the sensitizer surface in accordance with the invention, the major decay path for triplet excitions generated in the crystal would be triplet-triplet annihilation in the crystal bulk.

Calculations based upon reported values of diffusion parameters for triplet excitons in anthracene cyrstals show that at 1 torr oxygen pressure, not more than 1% of the triplet excitons can transfer energy to oxygen employing conventional technology. Even at 10 torr oxygen pressure, the quantum transfer efficiency is still less than 10%. However, with a 1% coverage of the cyrstal surface by triplet exciton traps, in accordance with the present invention, more than 98% of the excitons generated in the crystal base can transfer energy to oxygen molecules at 1 torr oxygen pressure. A photon absorption rate corresponding to one solar constant has been used in these calculations.

EXAMPLES

1. Trypaflavine/Eosin

A layer of trypaflavine $10^{-5}$ cm thick is deposited by vacuum sublimation or other suitable technique onto a flat substrate. Next, eosin is deposited onto the trypaflavine layer, with a surface coverage of one percent of one monolayer. Oxygen gas flows past the dye surface, which is illuminated by solar radiation. Collisions of ground state oxygen molecules with excited eosin molecules lead to energy transfer from the dye surface to the oxygen. The singlet oxygen is then swept away from the surface and utilized directly in a laser device, or it is stored in the form of an endoperoxide by reaction with certain organic hydrocarbons, as in Schaap et al noted hereinabove. Transfer of excitation from the trypaflavine layer and trapping at the surface sublayer of eosin molecules is promoted by lower triplet energy of eosin (15600 $cm^{-1}$) compared with trypaflavine (17869 $cm^{-1}$).

2. Eosin/Tetracene

A layer of eosin $10^{-5}$ cm thick is deposited onto a flat substrate. A submonolayer of one percent surface coverage of tetracene molecules is deposited on the eosin layer. As in Example No. 1 above, radiant energy is absorbed by the thick (here the eosin) layer and transferred to surface energy trapping molecules (here the tetracene molecules). Oxygen gas flows past the dye layers as before, and singlet oxygen is generated by collision of ground state oxygen with excited tetracene molecules. Since tetracene has a lower triplet energy (10300 $cm^{-1}$) than eosin (15600 $cm^{-1}$), excitation energy is transferred to and trapped at the surface tetracene sites, and hence to the oxygen (7870 $cm^{-1}$).

3. Trypaflavine/Eosin/Tetracene

In this example, a layer of trypaflavine (roughly $10^{-5}$ cm thick) is deposited onto a flat substrate. Next, a $10^{-5}$ cm thick layer of eosin is deposited on the trypaflavine layer. Finally a submonolayer (one percent surface coverage) of tetracene is deposited on the eosin layer. Radiant energy absorbed in the trypaflavine layer is transferred as exciton energy to the eosin layer and finally to the surface tetracene molecules where it is trapped. Radiant energy absorbed by the eosin layer is also transferred as exciton energy to and trapped by tetracene molecules at the surface. As in Example No. 2, singlet oxygen is produced by transfer of energy from tetracene molecules at the surface to ground state oxygen molecules which impinge on the surface from the gas phase. This example uses two energy collection dye layers and one energy trapping submonolayer. The presence of two collection layers allows a larger spectral region to be covered, and hence a more efficient collection of radiant solar energy.

The nominal or peak wavelength sensitivities for trypaflavine, eosin and tetracene are 460 nm, 510 nm and 475 nm respectively. Other exemplary compounds suitable for the sensitizer layers of the present invention, together with their respective associated triplet energies and peak absorption wavelengths are as follows:

TABLE

| DYE COMPOUND | TRIPLET ENERGY ($cm^{-1}$) | PEAK ABSORPTION WAVELENGTH (nm) |
|---|---|---|
| Rhodamine B | 15000 | 575 |
| Acriflavin | 17800 | 340 |
| Erythrosin | 15150 | 535 |
| 1,1'-Diethyl 2,2'-Cyamine | 15500 | 520 |
| Pyridocyanine Dyes | 17000 | 490 |
| 1,1'-Ethylene-2,2'-Cyamine-Chloride | 16000 | 520 |
| Acridine Orange | 17100 | 500 |
| Phthalocyanine | 11000 | 720 |

Also contemplated are derivatives of or polymers containing these and other exemplary dye compounds.

The invention claimed is:

1. A solid phase sensitizer for production of gas phase singlet oxygen comprising a dye crystal base responsive to absorption of radiant energy to generate triplet excitons at a first exciton energy level, and a sub-monomolecular layer of organic molecules on the surface of said crystal base having a second exciton energy level which is less than said first level but greater than the triplet exciton energy level of molecular oxygen.

2. The solid phase sensitizer set forth in claim 1 wherein said crystal base comprises a plurality of crystal layers each having a triplet exciton state energy which is greater than the energy of the next-adjacent layer toward said surface.

3. A solid phase photosensitizer for production of gas phase singlet oxygen comprising a solid phase substrate, at least one layer of organic polycrystalline dye on said substrate providing a continuous outer surface and responsive to absorption of radiant energy to generate triplet excitons, and a layer of organic molecules segmented into discrete non-contacting zones on said outer surface, said segmented layer having a triplet state energy which is less than the triplet state energy of said at least one layer but greater than the triplet state energy of molecular oxygen.

4. The solid phase photosensitizer set forth in claim 3 comprising a plurality of said polycrystalline dye layers, each having a triplet state energy which is greater than that of the next-adjacent layer toward said surface, said plurality of layers being responsive to absorprtion of radiant energy at differing wavelengths to generate said excitons.

5. The photosensitizer set forth in claim 3 wherein said at least one layer is selected from the group consisting of trypaflavine, eosin and tetracene.

6. The photosentizer set forth in claim 5 wherein said at least one polycrystalline dye layer has a thickness on the order of $10^{-5}$ cm.

* * * * *